United States Patent
Delisle et al.

(10) Patent No.: US 10,991,262 B2
(45) Date of Patent: Apr. 27, 2021

(54) PERFORMANCE METRICS IN AN INTERACTIVE COMPUTER SIMULATION

(71) Applicant: CAE Inc., Saint-Laurent (CA)

(72) Inventors: Jean-François Delisle, Saint-Laurent (CA); Antoine Dufour, Saint-Laurent (CA); Marc-André Proulx, Saint-Laurent (CA); Dac Toan Ho, Saint-Laurent (CA)

(73) Assignee: CAE Inc., Saint-Laurent (CA)

( * ) Notice: Subject to any disclaimer, the term of this patent is extended or adjusted under 35 U.S.C. 154(b) by 408 days.

(21) Appl. No.: 15/942,404

(22) Filed: Mar. 30, 2018

(65) Prior Publication Data
US 2019/0304322 A1    Oct. 3, 2019

(51) Int. Cl.
*G09B 9/08*     (2006.01)
*G06F 17/18*    (2006.01)
*G07C 5/08*     (2006.01)
*G09B 19/16*    (2006.01)
*G09B 5/00*     (2006.01)

(52) U.S. Cl.
CPC ............. *G09B 9/08* (2013.01); *G06F 17/18* (2013.01); *G07C 5/0808* (2013.01); *G09B 5/00* (2013.01); *G09B 19/165* (2013.01)

(58) Field of Classification Search
CPC ......... G06F 30/00; G06F 30/15; G06F 17/18; G09B 9/08; G09B 5/00; G09B 19/165; G07C 5/0808; G06Q 10/06393; G06Q 50/205
USPC .......................................................... 703/2
See application file for complete search history.

(56) References Cited

U.S. PATENT DOCUMENTS

| | | | |
|---|---|---|---|
| 7,571,082 B2 | 8/2009 | Gilpin et al. | |
| 8,170,976 B2 | 5/2012 | Dargue et al. | |
| 8,751,867 B2 | 6/2014 | Marvasti et al. | |
| 8,831,291 B1 * | 9/2014 | Napoletano | G09B 9/06 382/107 |

(Continued)

FOREIGN PATENT DOCUMENTS

| | | | |
|---|---|---|---|
| EP | 2439718 | 4/2012 | |
| EP | 2439718 A1 * | 4/2012 | G09B 19/16 |

(Continued)

*Primary Examiner* — Cedric Johnson
(74) *Attorney, Agent, or Firm* — Benoit Yelle; Matthew Roy; Gowling WLG (Canada) LLP

(57) ABSTRACT

A simulation mapping system and method for determining a plurality of performance metric values in relation to a training activity performed by a user in an interactive computer simulation, the interactive computer simulation simulating a virtual element comprising a plurality of dynamic subsystems. A processor module obtains dynamic data related to the virtual element being simulated in an interactive computer simulation station comprising a tangible instrument module. The dynamic data captures actions performed by the user on tangible instruments. The processor module constructs a dataset corresponding to the plurality of performance metric values from the dynamic data having a target time step by synchronizing dynamic data and by inferring, for at least one missing dynamic subsystems of the plurality of dynamic subsystems missing from the dynamic data, a new set of data into the dataset from dynamic data associated to one or more co-related dynamic subsystems.

20 Claims, 8 Drawing Sheets

(56) References Cited

U.S. PATENT DOCUMENTS

| | | | |
|---|---|---|---|
| 9,721,478 B2 * | 8/2017 | Wilcox | G09B 9/44 |
| 2009/0319238 A1 | 12/2009 | Bedard | |
| 2011/0171612 A1 * | 7/2011 | Gelinske | G09B 9/30 434/35 |
| 2013/0073063 A1 | 3/2013 | Kiffmeier et al. | |
| 2016/0275219 A1 | 9/2016 | Feuer et al. | |
| 2016/0358498 A1 * | 12/2016 | Fucke | G09B 9/08 |
| 2017/0075749 A1 | 3/2017 | Ambichl et al. | |
| 2017/0151020 A1 | 6/2017 | Grady et al. | |
| 2017/0206797 A1 | 7/2017 | Solomon et al. | |

FOREIGN PATENT DOCUMENTS

| | | | | |
|---|---|---|---|---|
| GB | 2260304 | | 4/1993 | |
| GB | 2260304 A | * | 4/1993 | G09B 19/165 |
| JP | 2017062297 | | 3/2017 | |
| WO | WO2017118670 | | 7/2017 | |

\* cited by examiner

PERFORMANCE METRICS IN AN INTERACTIVE COMPUTER SIMULATION

TECHNICAL FIELD

The present invention relates to data communication and, more particularly, to data communication as required in the context of training through interactive computer simulations.

BACKGROUND

An interactive computer simulation system performs one or more interactive computer simulations. Each interactive computer simulation comprises one or more virtual simulated elements each representing an actual system (e.g., multiple virtual aircraft systems each representing an actual aircraft). Each interactive computer simulation provides a virtual computer generated environment and various tangible instruments (or controls) in a simulation station to allow enactment of different scenarios for the purpose of training one or more users (or trainees), using one or more of the virtual simulated elements, in the operation and/or understanding of the corresponding one or more actual systems. The virtual simulated element, or simulated element, is defined herein as a simulated system. The simulated element is a virtual version that simulates, to the extent required by the interactive computer simulation, behavior of an actual system. The various tangible instruments accessible to the one or more users in the simulation station replicate actual instruments or otherwise reproduce behavior of the actual instruments found in the actual system.

Different interactive computer simulation systems rely on different strategies for providing a training environment that suits given training needs. For instance, some interactive computer simulation stations embed real life instruments or systems parts (i.e., real avionics boxes or real chirurgical tool) while some others are made specifically for the purpose of the interactive computer simulation system.

Making sure that the data required from the different subsystems, and that need to be provided to the different subsystems, is properly collected and exchanged is the challenge addressed by the present invention.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first set of embodiments a first aspect is directed to a simulation mapping system for determining a plurality of performance metric values in relation to a training activity performed by a user in an interactive computer simulation, the interactive computer simulation simulating a virtual element comprising a plurality of dynamic subsystems. The simulation mapping system comprises a processor module that obtains dynamic data related to the virtual element being simulated in an interactive computer simulation station comprising a tangible instrument module. The dynamic data captures actions performed by the user during the training activity on one or more tangible instruments of the tangible instrument module. The processor module also constructs a dataset corresponding to the plurality of performance metric values from the dynamic data having a target time step by synchronizing dynamic data from at least two of the dynamic subsystems into the dataset considering the target time step, the at least two of the dynamic subsystems being associated to at least one common performance metric values from the plurality of performance metric values and by inferring, for at least one missing dynamic subsystems of the plurality of dynamic subsystems missing from the dynamic data, a new set of data into the dataset from dynamic data associated to one or more co-related dynamic subsystems, the co-related dynamic subsystems and the at least one missing dynamic subsystems impacting at least one common performance metric values from the plurality of performance metric values.

The processor module may optionally obtain dynamic data from a plurality of interactive computer simulation stations and constructs the dataset having the target time step for the plurality of interactive computer simulation stations.

The processor module may optionally further provide the dataset as a common standardized stream consumers, the consumers comprising a grading system. The common standardized stream may comprise classification information related to the plurality of performance metric values.

The processor module may optionally, when constructing the dataset corresponding to the plurality of performance metric values from the dynamic data having the target time, add at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

The processor module may optionally apply a linear quadratic estimation (LQE) when constructing the dataset and/or a probabilistic directed acyclic graphical model when constructing the dataset.

In the first set of embodiments a second aspect is directed to a method for determining a plurality of performance metric values in relation to a training activity performed by a user in an interactive computer simulation, the interactive computer simulation simulating a virtual element comprising a plurality of dynamic subsystems. The method comprises obtaining dynamic data related to the virtual element being simulated in an interactive computer simulation station comprising a tangible instrument module. The dynamic data captures actions performed by the user during the training activity on one or more tangible instruments of the tangible instrument module. The method also comprises constructing a dataset corresponding to the plurality of performance metric values from the dynamic data having a target time step by synchronizing dynamic data from at least two of the dynamic subsystems into the dataset considering the target time step, the at least two of the dynamic subsystems being associated to at least one common performance metric values from the plurality of performance metric values and inferring, for at least one missing dynamic subsystem of the plurality of dynamic subsystems missing from the dynamic data, a new set of data into the dataset from dynamic data associated to one or more co-related dynamic subsystems, the co-related dynamic subsystems and the at least one missing dynamic subsystems impacting the at least one common performance metric values from the plurality of performance metric values.

The method may optionally further comprise obtaining dynamic data from a plurality of interactive computer simulation stations, wherein constructing the dataset having the target time step is performed for the plurality of interactive computer simulation stations.

The method may optionally further comprise providing the dataset as a common standardized stream consumers, the consumers comprising a grading system. The common standardized stream may optionally comprise classification information related to the plurality of performance metric values.

The method may optionally further comprise, when constructing the dataset corresponding to the plurality of performance metric values from the dynamic data having the target time, adding at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

Optionally, constructing the dataset may performed by applying a linear quadratic estimation (LQE) and/or by applying a probabilistic directed acyclic graphical model when constructing the dataset.

In a second set of embodiments a first aspect of is directed to an interactive computer simulation system for training a user in an interactive computer simulation in the performance of a task through a training activity, the interactive computer simulation simulating a virtual element. The interactive computer simulation system comprises an interactive computer simulation station and a processor module. The interactive computer simulation station comprises a tangible instrument module, the user interacting with the tangible instrument module for controlling the virtual element in the interactive computer simulation.

The processor module obtains a plurality of performance metric datasets related to the virtual element being simulated, the plurality of performance metric datasets representing results of the interactions between the user and the tangible instrument module and, during execution of the interactive computer simulation, detects, in the plurality of performance metric datasets, a plurality of actual maneuvers of the virtual element during the training activity, identifies one or more standard operating procedures (SOP) for the training activity from a plurality of the individually detected actual maneuvers, provides, in real-time upon detection of the SOPs, information for display in the interactive computer simulation related the SOPs.

The system may optionally further comprise a simulation mapping system for determining a plurality of performance metric values in relation to the training activity performed by the user in the interactive computer simulation, the interactive computer simulation simulating the virtual element comprising a plurality of dynamic subsystems. The plurality of performance metric datasets may be provided by the simulation mapping system.

The processor module may further obtain a scorecard related to the training activity to establish a list of the one or more SOPs of interest. The one or more SOPs may identify the plurality of the individually detected actual maneuvers related thereto.

The plurality of performance metric datasets related to the virtual element being simulated may be used to provide a grading scorecard for the detected SOPs. The information for display in the interactive computer simulation related the SOPs may further comprise the grading scorecard for the detected SOPs The detected actual maneuvers may be logged for post-activity debriefing.

In an optional embodiment, the processor module further obtains a plurality of expected maneuvers of the virtual element during the training activity, the plurality of expected maneuvers comprising a plurality of expected individual maneuvers expected and one or more nested maneuvers formed by more than one individual maneuvers from the plurality of expected individual maneuvers, computes the plurality of performance metric datasets to identify actual maneuvers of the virtual element during the training activity, identifies and grades one or more actual nested maneuvers against corresponding ones of the expected nested maneuvers and, notwithstanding performance of the actual nested maneuvers, identifies and grades a plurality of actual individual maneuvers against the plurality of expected individual maneuvers.

In the second set of embodiments a second aspect is directed to an interactive computer simulation station for training a user in an interactive computer simulation in the performance of a task through a training activity, the interactive computer simulation simulating a virtual element. The interactive computer simulation station comprises a tangible instrument module, the user interacting with the tangible instrument module for controlling the virtual element in the interactive computer simulation and a processor module.

The processor module obtains a plurality of performance metric datasets related to the virtual element being simulated, the plurality of performance metric datasets representing results of the interactions between the user and the tangible instrument module and, during execution of the interactive computer simulation, detects, in the plurality of performance metric datasets, a plurality of actual maneuvers of the virtual element during the training activity, identifies one or more standard operating procedures (SOP) for the training activity from a plurality of the individually detected actual maneuvers and provides, in real-time upon detection of the SOPs, information for display in the interactive computer simulation related the SOPs.

The interactive computer simulation station may further comprise a network interface nodule for receiving the plurality of performance metric datasets from a simulation mapping system that determines a plurality of performance metric values in relation to the training activity performed by the user in the interactive computer simulation.

The processor module may optionally further obtain a scorecard related to the training activity to establish a list of the one or more SOPs of interest. The one or more SOPs may further identify the plurality of the individually detected actual maneuvers related thereto.

The plurality of performance metric datasets related to the virtual element being simulated may be used to provide a grading scorecard for the detected SOPs. The information for display in the interactive computer simulation related the SOPs may comprise the grading scorecard for the detected SOPs.

In an optional embodiment, the processor module further obtains a plurality of expected maneuvers of the virtual element during the training activity, the plurality of expected maneuvers comprising a plurality of expected individual maneuvers expected and one or more nested maneuvers formed by more than one individual maneuvers from the plurality of expected individual maneuvers, computes the plurality of performance metric datasets to identify actual maneuvers of the virtual element during the training activity, identifies and grades one or more actual nested maneuvers against corresponding ones of the expected nested maneuvers and, notwithstanding performance of the actual nested maneuvers, identifies and grades a plurality of actual individual maneuvers against the plurality of expected individual maneuvers.

In the second set of embodiments a third aspect is directed to a method for training a user in an interactive computer simulation in the performance of a task through a training activity, the interactive computer simulation simulating a virtual element. The method comprises in an interactive computer simulation station, providing a tangible instrument module to the user for controlling the virtual element in the interactive computer simulation. The method also comprises obtaining a plurality of performance metric datasets related to the virtual element being simulated, the plurality of performance metric datasets representing results of the interactions between the user and the tangible instrument module and, during execution of the interactive computer simulation at the interactive computer simulation station, detecting, in the plurality of performance metric datasets, one or more actual maneuvers of the virtual element during the training activity, identifying one or more standard operating procedures (SOP) from the detected actual maneuvers and displaying, in real-time upon detection of the SOPs, information in the interactive computer simulation related the SOPs.

The method may further optionally comprise determining, at a simulation mapping system, a plurality of performance metric values in relation to the training activity performed by the user in the interactive computer simulation, the interactive computer simulation simulating the virtual element comprising a plurality of dynamic subsystems. The plurality of performance metric datasets may be provided by the simulation mapping system.

The method may further optionally comprise obtaining a scorecard related to the training activity to establish a list of the one or more SOPs of interest. The one or more SOPs may further identify the plurality of the individually detected actual maneuvers related thereto.

The plurality of performance metric datasets related to the virtual element being simulated may be used to provide a grading scorecard for the detected SOPs. The information for display in the interactive computer simulation related the SOPs may then optionally comprise the grading scorecard for the detected SOPs The method may further optionally comprise logging the detected actual maneuvers and debriefing the training activity from the logged detected actual maneuvers.

In some embodiments, the method may further optionally comprise obtaining a plurality of expected maneuvers of the virtual element during the training activity, the plurality of expected maneuvers comprising a plurality of expected individual maneuvers expected and one or more nested maneuvers formed by more than one individual maneuvers from the plurality of expected individual maneuvers, computing the plurality of performance metric datasets to identify actual maneuvers of the virtual element during the training activity, identifying and grades one or more actual nested maneuvers against corresponding ones of the expected nested maneuvers and, notwithstanding performance of the actual nested maneuvers, identifying and grading a plurality of actual individual maneuvers against the plurality of expected individual maneuvers.

In a third set of embodiments a first aspect is directed to an interactive computer-based training system for assessing a training activity performed by a user in an interactive computer simulation, the interactive computer simulation simulating a virtual element. The training system comprises an interactive computer simulation station comprising a tangible instrument module, the user interacting with the tangible instrument module for controlling the virtual element in the interactive computer simulation and a processor module. The processor module obtains a plurality of performance metric datasets related to the virtual element being simulated the interactive computer simulation station, the plurality of performance metric datasets representing results of the interactions between the user and the tangible instrument module, obtains a plurality of expected maneuvers of the virtual element during the training activity, the plurality of expected maneuvers, computes the plurality of performance metric datasets to identify actual maneuvers of the virtual element during the training activity, identifies one or more failed actual maneuvers of the virtual element during the training activity against corresponding ones of the expected maneuvers and performs computational regression on the actual maneuvers of the virtual element compared to the expected maneuvers of the virtual element to identify one or more root causes of the failed actual maneuvers, the computational regression being performed on the actual maneuvers notwithstanding the corresponding expected maneuvers being met thereby.

The system may further optionally comprise a simulation mapping system for determining a plurality of performance metric values in relation to the training activity performed by the user in the interactive computer simulation, the interactive computer simulation simulating the virtual element comprising a plurality of dynamic subsystems, wherein the plurality of performance metric datasets is provided by the simulation mapping system.

The processor module may further optionally map, in real-time, each one of the actual maneuvers of the virtual element during the training activity on causal model for linking the one actual maneuver with previous ones of the actual maneuvers. The processor module may then optionally associate a probability rating to the one or more root causes of the failed actual maneuvers considering the causal model.

The processor module may further optionally provide to an instructor of the user, in real-time, the one or more root causes of the failed actual maneuvers.

The plurality of performance metric datasets related to the virtual element being simulated may be used to provide a grading scorecard for the actual maneuvers. The grading scorecard for the actual maneuvers may be provided for display in the interactive computer simulation.

In the third set of embodiments a second aspect is directed to an interactive computer simulation station for assessing a training activity performed by a user in an interactive computer simulation, the interactive computer simulation simulating a virtual element. The interactive computer simulation station comprises a tangible instrument module, the user interacting with the tangible instrument module for controlling the virtual element in the interactive computer simulation and a processor module. The processor module obtains a plurality of performance metric datasets related to the virtual element being simulated the interactive computer simulation station, the plurality of performance metric datasets representing results of the interactions between the user and the tangible instrument module, obtains a plurality of expected maneuvers of the virtual element during the training activity, the plurality of expected maneuvers, computes the plurality of performance metric datasets to identify actual maneuvers of the virtual element during the training activity, identifies one or more failed actual maneuvers of the virtual element during the training activity against corresponding ones of the expected maneuvers and performs computational regression on the actual maneuvers of the virtual element compared to the expected maneuvers of the virtual element to identify one or more root causes of the failed actual maneuvers, the computational regression being performed on the actual maneuvers notwithstanding the corresponding expected maneuvers being met thereby.

The interactive computer simulation station may further comprise a network interface nodule for receiving the plurality of performance metric datasets from a simulation mapping system that determines a plurality of performance metric values in relation to the training activity performed by the user in the interactive computer simulation.

The processor module may further optionally map, in real-time, each one of the actual maneuvers of the virtual element during the training activity on causal model for linking the one actual maneuver with previous ones of the actual maneuvers and associate a probability rating to the one or more root causes of the failed actual maneuvers considering the causal model.

The processor module may further optionally provide to an instructor of the user, in real-time, the one or more root causes of the failed actual maneuvers.

The plurality of performance metric datasets related to the virtual element being simulated may be used to provide a grading scorecard for the actual maneuvers. The grading scorecard for the actual maneuvers may then be provided for display in the interactive computer simulation.

In the third set of embodiments a third aspect is directed to a method for assessing a training activity performed by a user in an interactive computer simulation, the interactive computer simulation simulating a virtual element. The method comprises obtaining a plurality of performance metric datasets related to the virtual element being simulated the interactive computer simulation station, the plurality of performance metric datasets representing results of interactions of the user with a tangible instrument module of an interactive computer simulation station, the user interacting with the tangible instrument module for controlling the virtual element in the interactive computer simulation, obtaining a plurality of expected maneuvers of the virtual element during the training activity, computing the plurality of performance metric datasets to identify actual maneuvers of the virtual element during the training activity, identifying one or more failed actual maneuvers of the virtual element during the training activity against corresponding ones of the expected maneuvers and performing computational regression on the actual maneuvers of the virtual element compared to the expected maneuvers of the virtual element to identify one or more root causes of the failed actual maneuvers, the computational regression being performed on the actual maneuvers notwithstanding the corresponding expected maneuvers being met thereby.

The method may optionally further comprise determining, at a simulation mapping system, a plurality of performance metric values in relation to the training activity performed by the user in the interactive computer simulation, the interactive computer simulation simulating the virtual element comprising a plurality of dynamic subsystems, wherein the plurality of performance metric datasets is provided by the simulation mapping system.

The method may optionally further comprise mapping, in real-time, each one of the actual maneuvers of the virtual element during the training activity on causal model for linking the one actual maneuver with previous ones of the actual maneuvers. The method may then further comprise associating a probability rating to the one or more root causes of the failed actual maneuvers considering the causal model and providing to an instructor of the user, in real-time, the one or more root causes of the failed actual maneuvers. The plurality of performance metric datasets related to the virtual element being simulated may be used to provide a grading scorecard for the actual maneuvers. The method may optionally further comprise providing for display in the interactive computer simulation the grading scorecard for the actual maneuvers.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Figure 1:
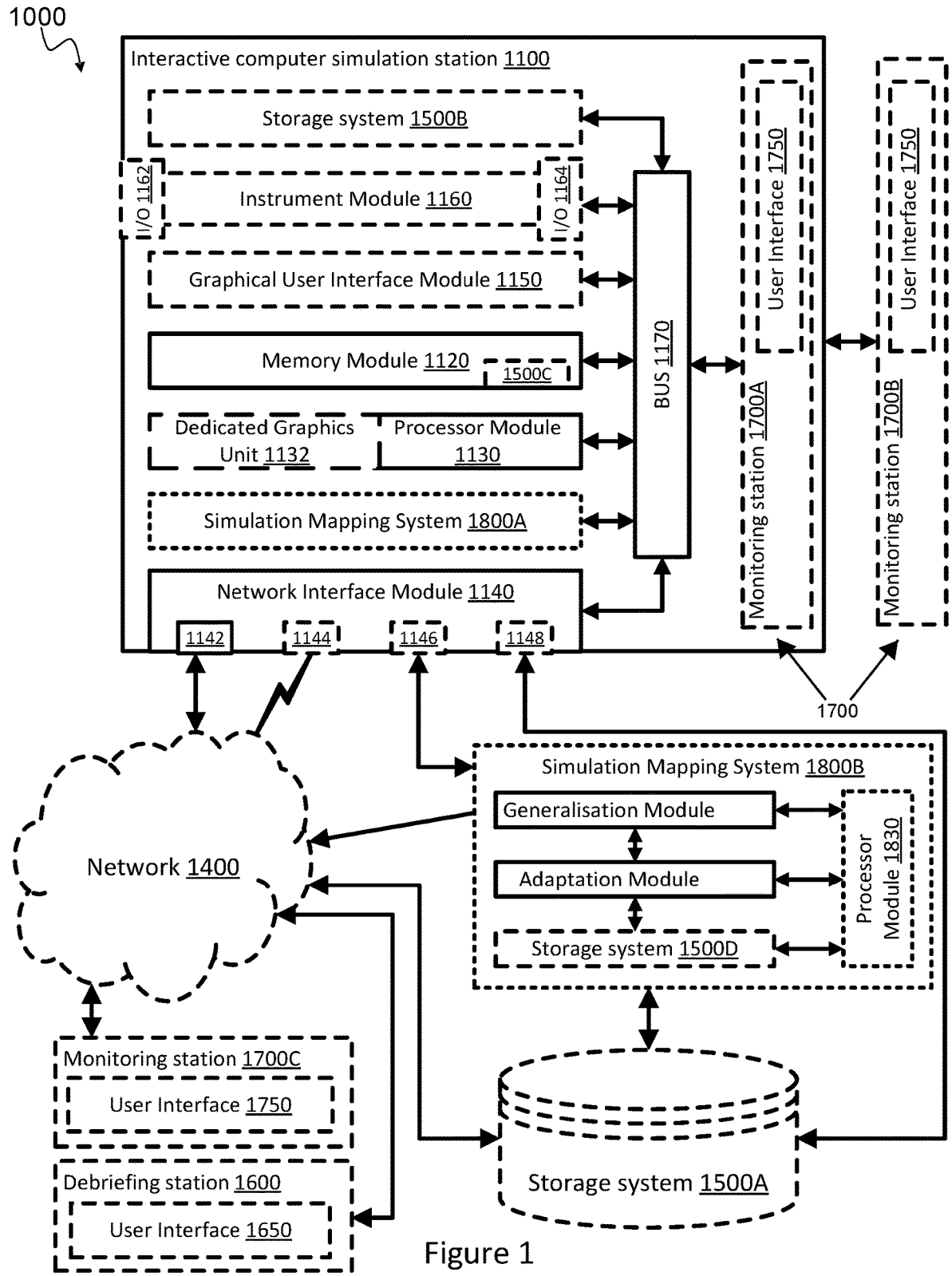
FIG. 1 is a logical modular view of an exemplary interactive computer simulation system in accordance with the teachings of the present invention.

Reference is now made to the drawings in which FIG. 1 shows a logical modular view of an exemplary interactive computer simulation system 1000 in accordance with the teachings of the present invention. The interactive computer simulation system 1000 performs one or more interactive computer simulations. Each interactive computer simulation comprises one or more virtual simulated elements each representing an actual system (e.g., multiple virtual aircraft systems each representing an actual aircraft). Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. The virtual simulated element, or simulated element, is defined herein as a simulated system, and may further comprise multiple simulated dynamic subsystems, or dynamic subsystems. The simulated element is a virtual version that simulates, to the extent required by the interactive computer simulation, behavior of an actual system. Correspondingly, each of the simulated dynamic subsystems of the simulated element is a virtual version, to the extent required but the interactive computer simulation, behavior of actual subsystems of the actual system.

In the depicted embodiment of FIG. 1, the interactive computer simulation system 1000 comprises an interactive computer simulation station 1100 for controlling at least one of the virtual simulated elements from the computer simulation executed on the interactive computer simulation system 1000. The interactive computer simulation system 1000 typically comprises multiple simulation stations (not shown) that each allow one or more users to interact to control a virtual simulated element in one of the interactive computer simulation(s) of the interactive computer simulation system 1000. The interactive computer simulation system 1000 also comprises a debriefing station 1600 and a monitoring station 1700 also sometimes referred to as an Instructor Operating Station (IOS). The monitoring stations may be provided for allowing various management tasks (not shown) to be performed in the interactive computer simulation system 1000. The tasks associated with the monitoring station 1700 allow for control and/or monitoring of one or more ongoing interactive computer simulations. For instance, the monitoring station 1700 may be used for allowing an instructor to participate to the interactive computer simulation and possibly additional interactive computer simulation(s). In some embodiments, the monitoring station 1700 is provided with the interactive computer simulation station 1100 (1700A). In other embodiments, the monitoring station 1700 may be co-located with the interactive computer simulation station 1100, e.g., within the same room (1700B) or simulation enclosure or remote therefrom (1700C), e.g., in different rooms or in different locations connected through a network 1400. Skilled persons will understand the many instances of the monitoring station 1700 may be concurrently provided in the interactive computer simulation system 1000. The monitoring station 1700 may provide a computer simulation management interface, which may be displayed on a dedicated monitoring station 1700 user interface 1750 or the GUI module 1150. The monitoring station 1700, in some embodiments, is provided as the GUI 1750 on a portable computing device (e.g., smartphone, tablet, portable computer or the like).

When multiple simulation stations 1100 are present in the system 1000, the monitoring station 1700 may present different views of the computer program management interface (e.g., to manage different aspects therewith) or they may all present the same view thereof. The computer program management interface may be permanently shown on a first of the screens of the monitoring station 1700 display module while a second of the screens of the monitoring station 1700 display module shows a view of the interactive computer simulation (i.e., adapted view considering characteristics of the second screen). The computer program management interface may also be triggered on the monitoring station 1700, e.g., by a touch gesture and/or an event in the interactive computer program (e.g., milestone reached, unexpected action from the user, or action outside of expected parameters, success or failure of a certain mission, etc.). The computer program management interface may provide access to settings of the interactive computer simulation and/or of the simulation station 1100. A virtualized monitoring station may also be provided to the user (e.g., through the GUI module 1150) on a main screen, on a secondary screen or a dedicated screen.

In some embodiments, the interactive computer simulation system 1000 comprises a debriefing station 1600. The debriefing station 1600 is sometimes referred to as a Brief and Debrief System (BDS). The debriefing station 1600 may provide functionalities also provided by the monitoring station 1700 in the context of debriefing past sessions thereat. For instance, when monitoring station 1700 and/or debriefing station 1600 functionalities are provided through the interactive computer simulation station 1100, the GUI module 1150/1650/1750 may further be used to monitor and control one or more ongoing or recorded interactive computer simulation (e.g., triggering/monitoring events and/or selecting a perspective from which to view the ongoing or recorded chain of events of one or more interactive computer simulation).

The simulation station 1100, the monitoring station 1700 and the debriefing station 1600 may be connected via a network 1400, via direct connections or a mix of direct and network connections. In the depicted example of FIG. 1, the simulation station 1100 is a distinct simulation station while, in some embodiments, the simulation station 1100 may be integrated with one or more of the simulation stations. Various network links may be implicitly or explicitly used in the context of the present invention. While a link may be depicted as a wireless link, it could also be embodied as a wired link using a coaxial cable, an optical fiber, a category 5 cable, and the like. A wired or wireless access point (not shown) may be present on links. Likewise, any number of routers and/or switches (not shown) may be present on links, which may further transit through the Internet.

In the depicted example of FIG. 1, the simulation station 1100 comprises a memory module 1120, a processor module 1130 and a network interface module 1140. The processor module 1130 may represent a single processor with one or more processor cores or an array of processors, each comprising one or more processor cores. In some embodiments, the processor module 1130 may also comprise a dedicated graphics processing unit 1132. The dedicated graphics processing unit 1132 may be required, for instance, when the interactive computer simulation system 1000 performs an immersive simulation (e.g., pilot training-certified flight simulator), which requires extensive image generation capabilities (i.e., quality and throughput) to maintain expected realism of such immersive simulation. Typically, each of the monitoring station 1700 and/or debriefing station 1600 comprise a memory module similar to 1120, a processor module similar to 1130 having a dedicated graphics processing unit similar to 1132, a network interface similar to 1140 and a bus similar to 1170, which have not been replicated on FIG. 1 for the sake of readability. In some embodiments, the monitoring station 1700 and/or debriefing station 1600 may also comprise an instrument module similar to 1160 and a simulation mapping system similar to 1800A.

The memory module 1120 may comprise various types of memory (different standardized or kinds of Random Access Memory (RAM) modules, memory cards, Read-Only Memory (ROM) modules, programmable ROM, etc.). The network interface module 1140 represents at least one physical interface that can be used to communicate with other network nodes. The network interface module 1140 may be made visible to the other modules of the simulation station 1100 through one or more logical interfaces. The actual stacks of protocols used by the physical network interface(s) and/or logical network interface(s) 1142, 1144, 1146, 1148 of the network interface module 1140 do not affect the teachings of the present invention. The variants of processor module 1130, memory module 1120 and network interface module 1140 usable in the context of the present invention will be readily apparent to persons skilled in the art.

A bus 1170 is depicted as an example of means for exchanging data between the different modules of the simulation station 1100. The present invention is not affected by the way the different modules exchange information between them. For instance, the memory module 1120 and the processor module 1130 could be connected by a parallel bus 1170, but could also be connected by a serial connection or involve an intermediate module (not shown) without affecting the teachings of the present invention.

Likewise, even though explicit mentions of the memory module 1120 and/or the processor module 1130 are not made throughout the description of the various embodiments, persons skilled in the art will readily recognize that such modules are used in conjunction with other modules of the simulation station 1100 to perform routine as well as innovative steps related to the present invention.

In the depicted example of FIG. 1, the interactive computer simulation system 1000 comprises a simulation mapping system 1800A, 1800B. As further explained and exemplified below, the simulation mapping system 1800A, 1800B gathers, processes, converts and/or sends dynamic data related to the interactive computer simulation, typically in the form of one or more streams of information, from the dynamic system and dynamic subsystems of the interactive computer simulation system 1000 (e.g., instrument module 1160, user interface 1150/1650/1750, video recorder system, simulation engine, simulation station's security system, etc.). The dynamic data is typically generated during the interactive computer simulation in relation to the simulated element along a session timeline.

In some embodiments, the simulation mapping system 1800A, 1800B comprises a local simulation mapping system 1800A, in each of the interactive computer simulation stations 1100, and a coordinating simulation mapping system 1800B for the interactive computer simulation system 1000. In some embodiments, the coordination aspects of the simulation mapping system 1800A, 1800B are distributed between the different local simulation mapping systems 1800A. In some embodiments, the local aspects of the simulation mapping system 1800A, 1800B are performed from the coordinating simulation mapping system 1800B (e.g., through access to a storage system 1500 and/or to the different elements of the interactive computer simulation system 1000).

In some embodiments, the simulation mapping system 1800B comprise a memory module similar to 1120, a network interface similar to 1140 and a bus similar to 1170, which have not been replicated on FIG. 1 for the sake of readability. The simulation mapping system 1800A, 1800B may rely on the processor module 1130 to process and/or convert the dynamic data. The simulation mapping system 1800A, 1800B may also comprise, in addition or alternatively, a processor module 1830 to process and/or convert the dynamic data. The processor module 1830 may further comprise a dedicated graphics processing unit similar to 1132. The processor module 1830 may also comprise a dedicated real-time processing unit (not shown) to process and/or convert at least some of the dynamic data. The dedicated real-time processing unit provides enhanced capabilities to support real-time processing or real-time processing priority. The dedicated real-time processing unit may be required, for instance, when the interactive computer simulation system 1000 performs an immersive simulation (e.g., pilot training-certified flight simulator), which may require the dynamic data to be timely processed and/or converted to maintain expected realism of such immersive simulation. In some embodiments, the processor module 1830 is partly or completely integrated in a cloud-based processing service. The processor module 1130, when used in the context of the simulation mapping system 1800, may therefore comprise capabilities to interact and/or manage the cloud-based processing service through the network interface 1140.

The simulation mapping system 1800A, 1800B may further comprise (not shown) an environment tracking module, which may be used to capture one or more feed of images and/or environmental data from the interactive computer simulation station 1100. For instance, the environment tracking module may comprise one or more 360-degree camera and/or a plurality of cameras throughout the interactive computer simulation station 1100 to provide a choice of perspectives therein. For instance, the perspectives offered through the cameras may be set to cover as many critical locations in the interactive computer simulation station 1100 (e.g., position of the hands of trainee(s), readings or settings on one or more of the instruments of the instrument module 1160 and/or determination of a position of one or more instruments, tracking of the trainee(s)' gaze or other body parts, etc. The environment tracking module may also comprise one or more sound recorders (e.g., for conversations in the simulation station as well as with outside elements), one or more thermometer, one or more biometric readers (e.g., trainee(s)' status readings, gaze detector, sleepiness detector, etc.), smoke or other visual impairment detector, etc.)

The interactive computer simulation system 1000 comprises a storage system 1500 for, among other aspects, collecting dynamic data in relation to the dynamic system and dynamic subsystems while the interactive computer simulation is performed. The dynamic data stored in the storage system 1500 comprises dynamic data necessary for the simulation mapping system 1800A, 1800B as well as results from the processing and/or converting performed by the simulation mapping system 1800A, 1800B. FIG. 1 shows examples of the storage system 1500 as a distinct database system 1500A, a distinct module 1500B of the computer system 1110, a sub-module 1500C of the memory module 1120 of the simulation station 1100 and/or a storage system 1500D comprises in the simulation mapping system 1800A, 1800B. The storage system 1500 may also comprise storage modules (not shown) on the monitoring station 1700 and/or debriefing station 1600. The storage system 1500 may be distributed over different systems A, B, C, D and/or the monitoring station 1700 and/or debriefing station 1600 or may be in a single system. The storage system 1500 may comprise one or more logical or physical as well as local or remote hard disk drive (HDD) (or an array thereof). The storage system 1500 may further comprise a local or remote database made accessible to the simulation station 1100 by a standardized or proprietary interface or via the network interface module 1140 (e.g., cloud-based storage service). In some embodiments, the storage system 1500 stores the dynamic data and/or the processed/converted data in relation to the simulation mapping system 1800A, 1800B in a cloud-based storage service. The variants of storage system 1500 usable in the context of the present invention will be readily apparent to persons skilled in the art.

The interactive computer simulation station 1100 may comprise a graphical user interface (GUI) module 1150 that may be used to visualize virtual dynamic subsystems from the virtual simulated element. The GUI module 1150 may comprise one or more display screens such as a wired or wireless flat screen, a wired or wireless touch-sensitive display, a tablet computer, a portable computer or a smart phone.

Users of the interactive computer simulation system 1000 (e.g., users of the simulation stations 1100) interact in the interactive computer simulation to control a virtual simulated element in a computer generated environment of the interactive computer simulation system 1000 (e.g., instructors or experts, trainees such as a pilot and co-pilot, a driver, an operator, a surgeon, a flight investigator, a training analyst, a flight analyst, etc.). Examples of virtual simulated elements include a simulated aircraft system, a simulated ground vehicle system, a simulated spacecraft or space station system, a simulated control room system, unmanned vehicle or drone, simulated human mannequin, etc. Examples of virtual dynamic subsystems vary depending on the virtual simulated element. In the example of a simulated aircraft system, typical virtual dynamic subsystems may include virtual hydraulic systems, virtual communication systems, virtual display systems, virtual wiring systems, virtual in-flight entertainment systems, virtual fuel systems, virtual lighting systems, virtual rudder system, virtual flap system, virtual landing gear system, etc. In the example of a simulated living system, typical virtual dynamic subsystems may include blood system, digestive system immunity response system, lymphatic system, nervous system, biometric data such as temperature, blood pressure and other related physical data, etc. When a trainee or user is involved, actual measurements of biometric data may also be recorded (e.g., for subsequent correlation with other recorded data). For instance, biometric data from a pilot interacting in a computer simulation with one or more tangible instruments at the simulation station 1100 may be recorded (such as temperature, blood pressure and other related physical data). As a skilled person would appreciate, most virtual subsystems are directly or indirectly affected by interactions of the user with one or more tangible instruments that allow the user to interact (e.g., provide different commands in order to control the virtual simulated element) during the interactive computer system in the computer generated environment. Some other virtual subsystems may be affected by time elapsed during the interactive computer system and may further take into account the interactions of the user with one or more tangible instruments. For instance, in the example of a simulated aircraft system, a virtual aircraft structure subsystem may comprise one or more virtual mechanical components. Failure of any one of virtual mechanical components, or the virtual aircraft structure subsystem altogether, may be based on accumulated mechanical stress considering use time (e.g., number of flights and operating hours) and also based on maneuvers caused by the pilot manipulating the one or more tangible instruments.

The tangible instrument provided by the instrument modules 1160 are tightly related to the element being simulated. In the example of the simulated aircraft system, typical instruments include various switches, levers, pedals and the like accessible to the user for controlling the aircraft in the interactive computer simulation. Depending on the type of simulation (e.g., level of immersivity), the tangible instruments may be more or less realistic compared to those that would be available in an actual aircraft. For instance, the tangible instrument provided by the module 1160 may replicate an actual aircraft cockpit where actual instruments found in the actual aircraft or physical interfaces having similar physical characteristics are provided to the user (or trainee). As previously describer, the actions that the user or trainee takes with one or more of the tangible instruments provided via the instrument module 1160 (modifying lever positions, activating/deactivating switches, etc.) allow the user or trainee to control the virtual simulated element in the interactive computer simulation. In the context of an immersive simulation being performed in the interactive computer simulation system 1000, the instrument module 1160 would typically support a replicate of an actual instrument panel found in the actual system being the subject of the immersive simulation. In such an immersive simulation, the dedicated graphics processing unit 1132 would also typically be required. While the present invention is applicable to immersive simulations (e.g., flight simulators certified for commercial pilot training and/or military pilot training), skilled persons will readily recognize and be able to apply its teachings to other types of interactive computer simulations.

In some embodiment, an optional external input/output (I/O) module 1162 and/or an optional internal input/output (I/O) module 1164 may be provided with the instrument module 1160. Skilled people will understand that any of the instrument modules 1160, 1260 and/or 1360 may be provided with one or both of the I/O modules such as the ones depicted for the computer system 1000. The external input/output (I/O) module 1162 of the instrument module 1160, 1260 and/or 1360 may connect one or more external tangible instruments (not shown) therethrough. The external I/O module 1162 may be required, for instance, for interfacing the interactive computer simulation system 1000 with one or more tangible instrument identical to an Original Equipment Manufacturer (OEM) part that cannot be integrated into the computer system 1100 (e.g., a tangible instrument exactly as the one that would be found in the actual system subject of the interactive simulation). The internal input/output (I/O) module 1164 of the instrument module 1160 may connect one or more tangible instruments integrated with the instrument module 1160. The I/O 1162 may comprise necessary interface(s) to exchange data, set data or get data from such integrated tangible instruments. The internal I/O module 1164 may be required, for instance, for interfacing the interactive computer simulation system 1100 with one or more integrated tangible instrument identical to an Original Equipment Manufacturer (OEM) part (e.g., a tangible instrument exactly as the one that would be found in the actual system subject of the interactive simulation). The I/O 1164 may comprise necessary interface(s) to exchange data, set data or get data from such integrated tangible instruments.

In some embodiments, a simulation plan may further be loaded (not shown) from the storage system 1500 in relation the interaction computer simulation that involves the virtual simulated element. The simulation plan may comprise a training plan, a lesson plan or a scenario-based plan (e.g., with specific or dynamic objectives to be reached). The simulation plan may also be used alternatively or additionally to set the period of time covering simulated events from the interactive computer simulation related to the selected virtual subsystem.

The interactive computer simulation system 1000 is typically used to train personnel for complex and/or risky operations. Each interactive computer simulation provides a virtual environment and various tangible instruments (or controls) to allow enactment of different scenarios for the purpose of training one or more users (or trainees), using one or more of the virtual simulated elements, in the operation and/or understanding of the corresponding one or more actual systems. In some situations, real-life training is simply not possible because the target scenario cannot be enacted safely in the real-life (e.g., military mission, rescue mission, medical treatment or operation, etc.). In other situations, it is impractical and/or too costly to enact the training scenario in real-life. The interactive computer simulation system 1000 alleviates the risks and allows for repeated training. The interactive computer simulation system 1000 also limits the overall costs of training when compared to real-life training. Evaluating the performance of the trainee, while it is sometimes only useful, may be critically important (e.g., evaluating preparedness before a mission, certifying competences for license purposes, etc.).

Typically, an evaluation of a trainee in the context of the interactive computer simulation system 1000 consists of an assessment by an instructor based on an interpretation of collected information (e.g., stored dynamic data associated with different events) as well as on visual subjective observations performed by the instructor during the simulation. While it is agreed that a certain level of subjectivity is inherent to most if not all evaluations, there is a perceived risk that the competences of the trainees may not be properly and systematically assessed. For instance, two different instructors may make different visual observations and interpret the same collected information differently. Similarly, quality and/or completeness of the collected data may not sufficient to properly assess performance.

For instance, different interactive computer simulation stations 1100 may comprise slightly different versions of the tangible instrument module 1160 for a single virtual element, leading to differences in the collected dynamic data (e.g., different avionics components in two replicated cockpit of different aircraft simulators for the same real aircraft). Furthermore, some data from dynamic subsystems necessary for the purpose of evaluation of may not be collected at all (e.g., because the data is not exposed to the rest of the virtual environment). For instances, data collected for an aircraft yoke may comprise simulated hydraulic pressure levels in different affected subsystems without comprising the angular position of the actual hardware yoke in the replicated cockpit, or vice-versa. Synchronization of the dynamic data may also create discrepancies in the quality of the resulting evaluation. Typically, the simulation of each of the systems and subsystems requires clock signals (or time steps) for the purpose of synchronization. While a subsystem typically keeps a single time step throughout a given interactive computer simulation, the time step for different subsystems may be different. Conversely, for data collection efficiency purposes, the time at which the dynamic data is collected is not typically constant throughout the simulation and may not either be the same as the initially defined time steps. This discrepancy leads to different integration steps, which, for dynamic systems and subsystems, may induce states divergence. For non-dynamic systems, the difference in time steps induces time delays that might have critical impact on the states being recreated. As another example, some simulators will fully virtualize the tangible instrument 1160 output inside the interactive simulation station 1100 and collect the dynamic data in the form of digital value accordingly (i.e., store a vector of flight-related instructions instead of storing a vector of angular positions for the aircraft yoke). The virtualization made of any given instrument is dependent on technologies available at the time of the development of the virtual element and, when a real instrument is integrated in a replicated environment, is also dependent on the technologies used by the manufacturer of the instrument. The resulting collected data may therefore present disparities considering the manner in which the virtualization has been made.

Figure 5:
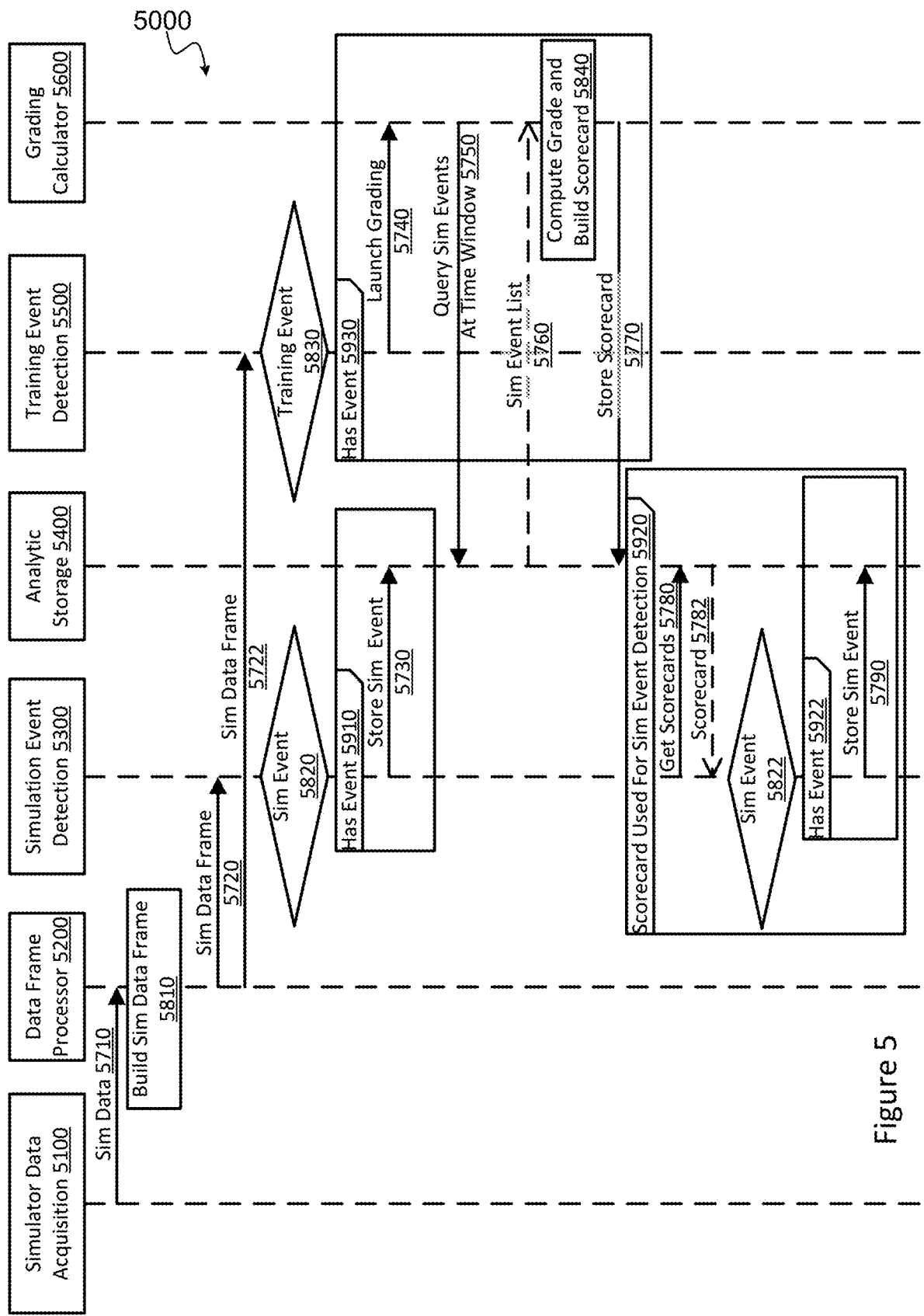
FIG. 5 is a flow and nodal operational chart 5000 in accordance with the teachings of the present invention.
Figure 6:
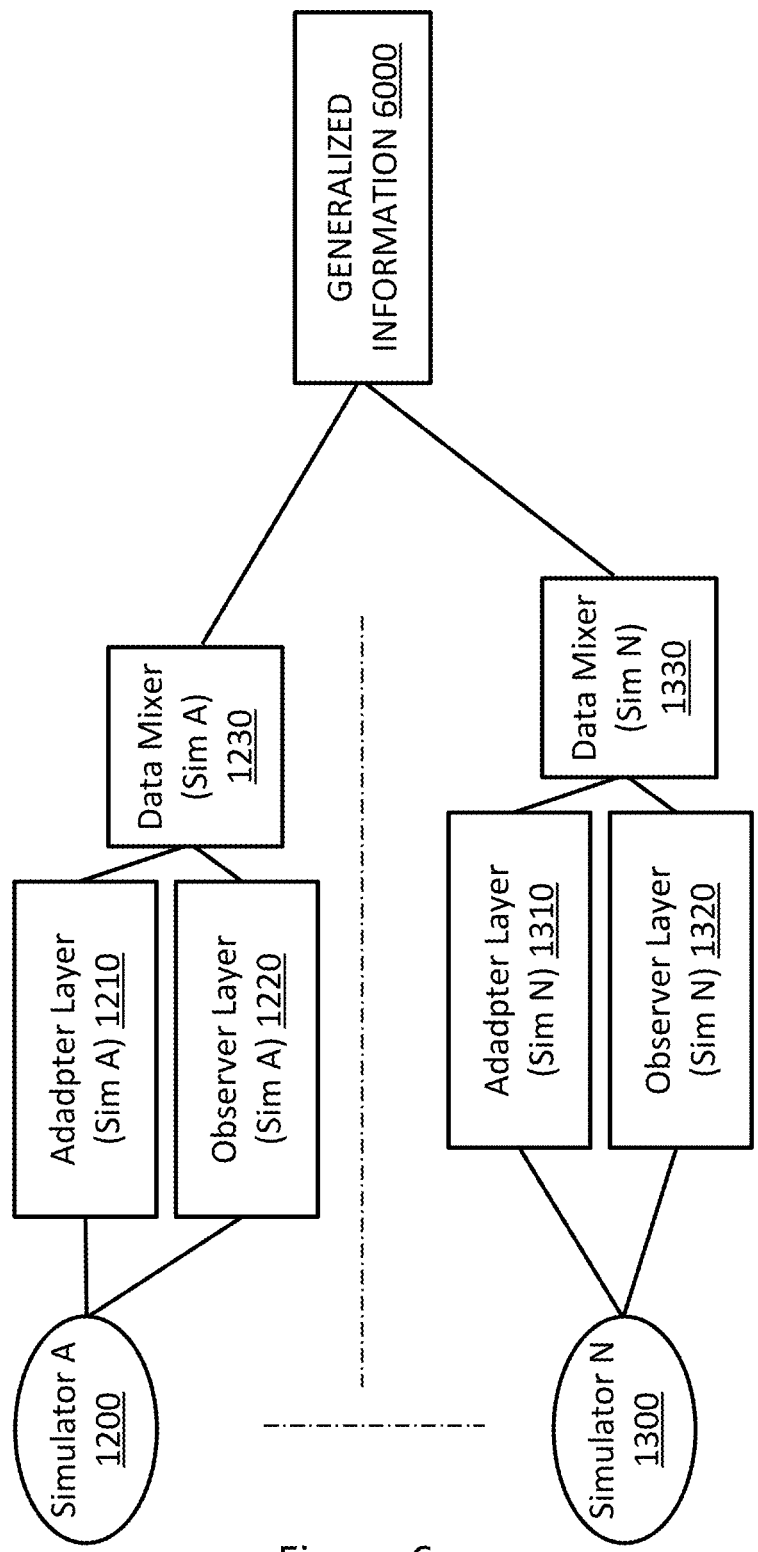
FIG. 6 is a logical modular view of an exemplary interactive computer simulation system in accordance with the teachings of the present invention.
Figure 7:
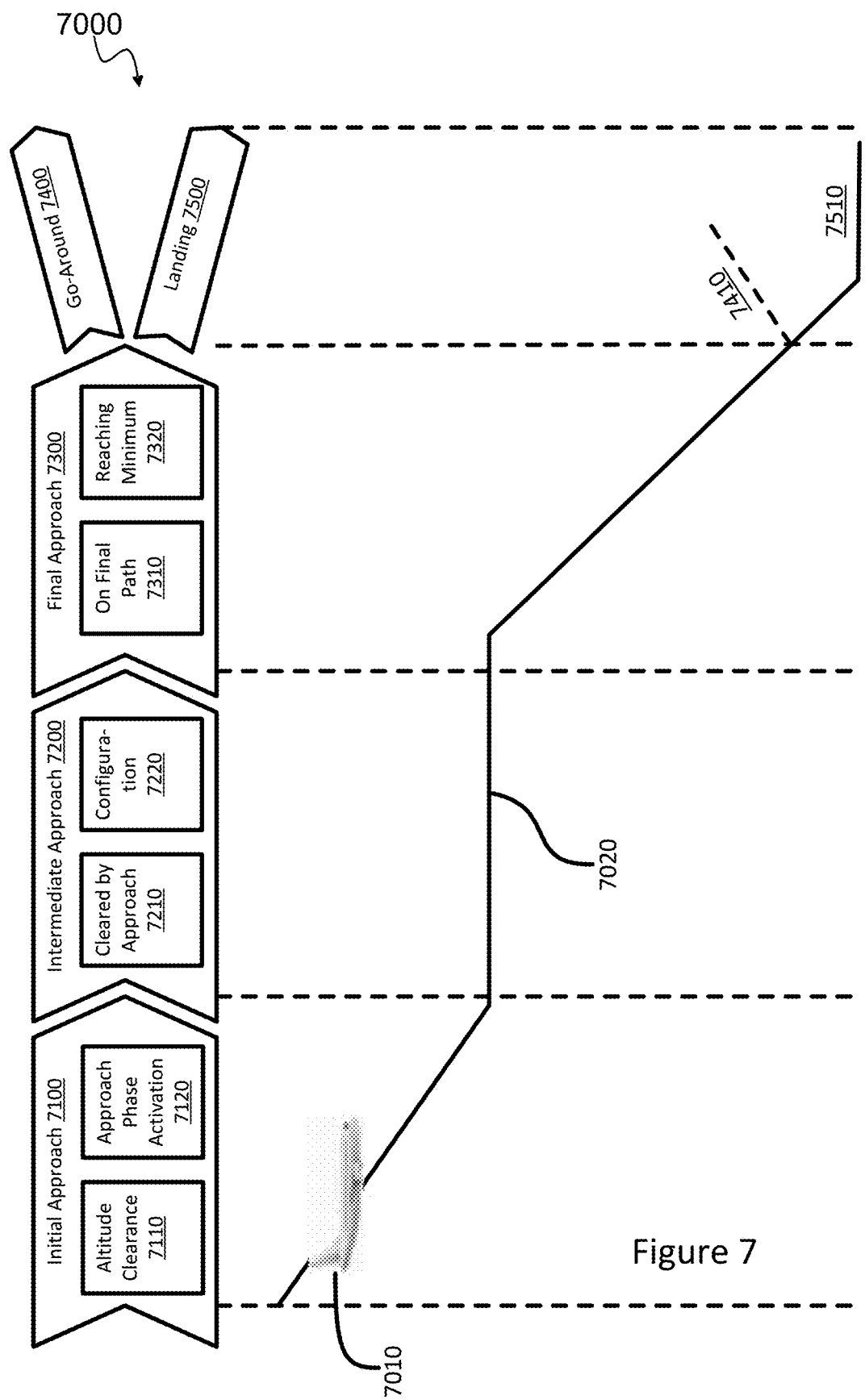
FIG. 7 is a logical representation of a first training activity in accordance with the teachings of the present invention.

Reference is now made to FIGS. 5 to 8. FIG. 5 depicts an example of data exchange in the context of training of one or more users in completion of one or more training activities. FIG. 6 provides an exemplary modular view of the system 1000 where multiple interactive training simulation stations (1200 and 1300) are depicted. Examples of training activities are depicted respectively on FIG. 7 (7000) and FIG. 8 (8000), in relation to flight simulations. Of course, skilled persons will acknowledge that the teachings presented herein are applicable to many different types of interactive simulations and training activities (e.g., flight, land and/or marine vehicle, healthcare-related element, etc.). On FIG. 7, the virtual element is a simulated aircraft 7010 on a flight path 7020. The training activity 7000 consists for one or more trainees to land the virtual aircraft 7010. In the interactive computer simulation station 1100, the trainees interact with the tangible instrument module 1160 to control the virtual aircraft 7010. Different stages 7100, 7200, 7300, 7400, 7500 are defined for the training activity and different standard operation procedures (SOPs) 7110, 7120, 7210, 7220, 7310, 7320, 7410, 7510 for the stages.

Figure 8:
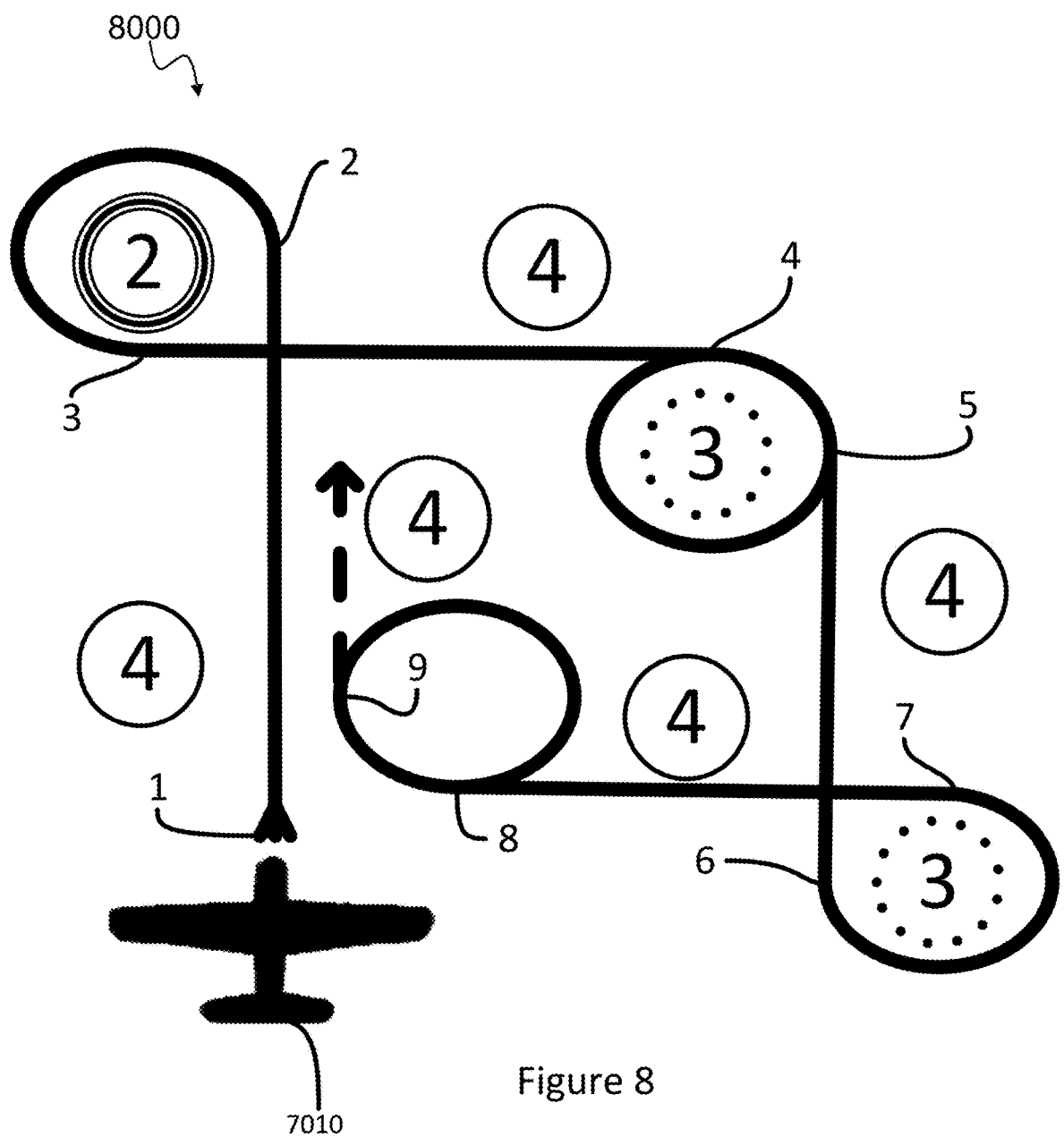
FIG. 8 is a logical representation of a second training activity in accordance with the teachings of the present invention.

On FIG. 8, the training activity 8000 consists for one or more trainees to follow a defined flight trajectory during which the virtual aircraft 7010 is expected to perform against a predefined pattern. In the interactive computer simulation station 1100, the trainees interact with the tangible instrument module 1160 to control the virtual aircraft 7010. Different manoeuvers are measured at different points 1, 2, 3, 4, 5, 6, 7, 8 and 9 for the training activity. On the depicted example 8000, first grades are awarded for each of the maneuvers (e.g., between 1 and 2, between 2 and 3, between 3 and 4, etc.) and a grade is awarded for the complete training activity 8000, which may also be referred to as a nested maneuver (i.e., a maneuver that consists of multiple individual maneuvers performed in a specific manner and/or order).

Figure 2:
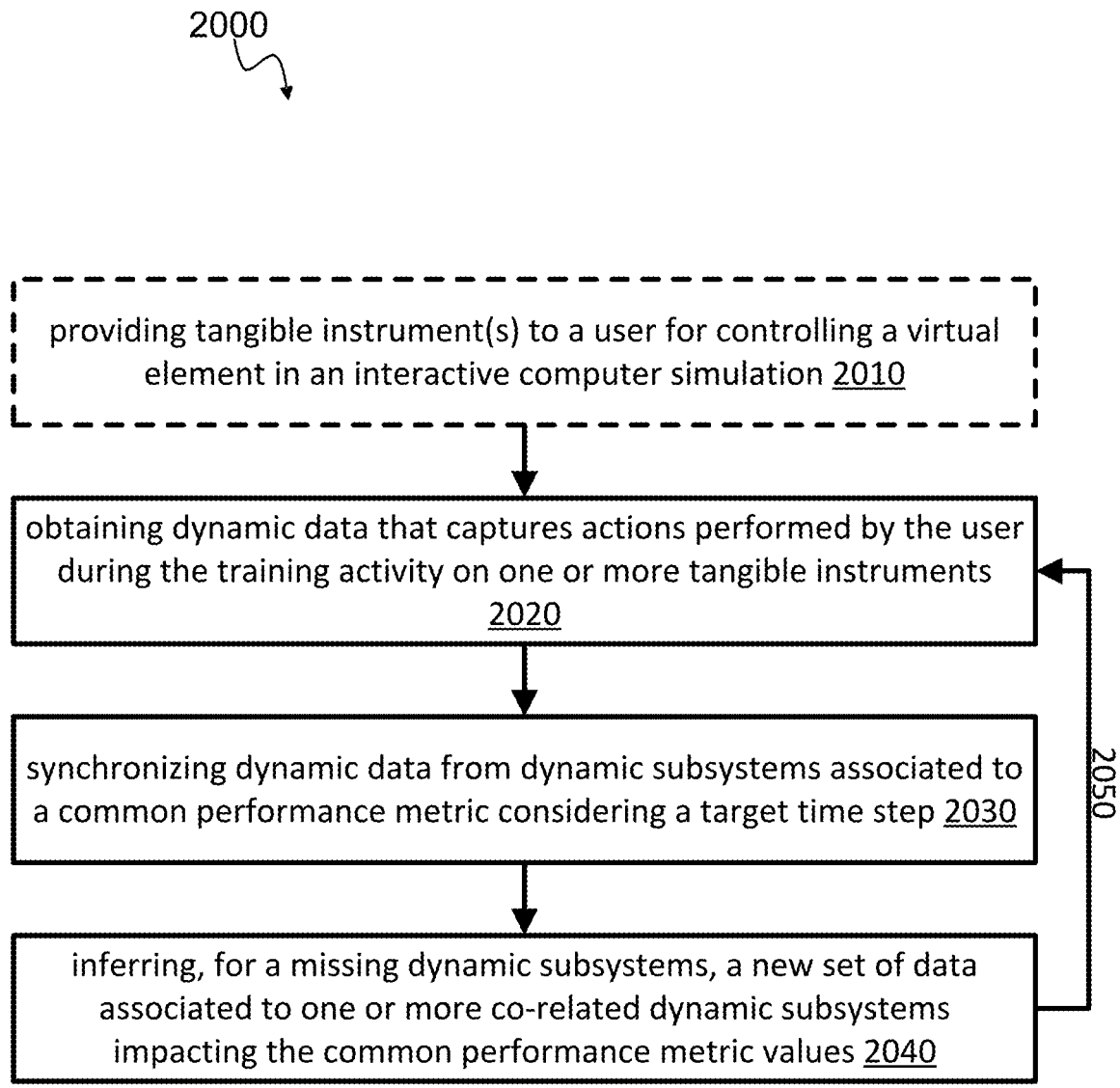
FIG. 2 is a flow chart of a first exemplary method in accordance with the teachings of the present invention.
Figure 3:
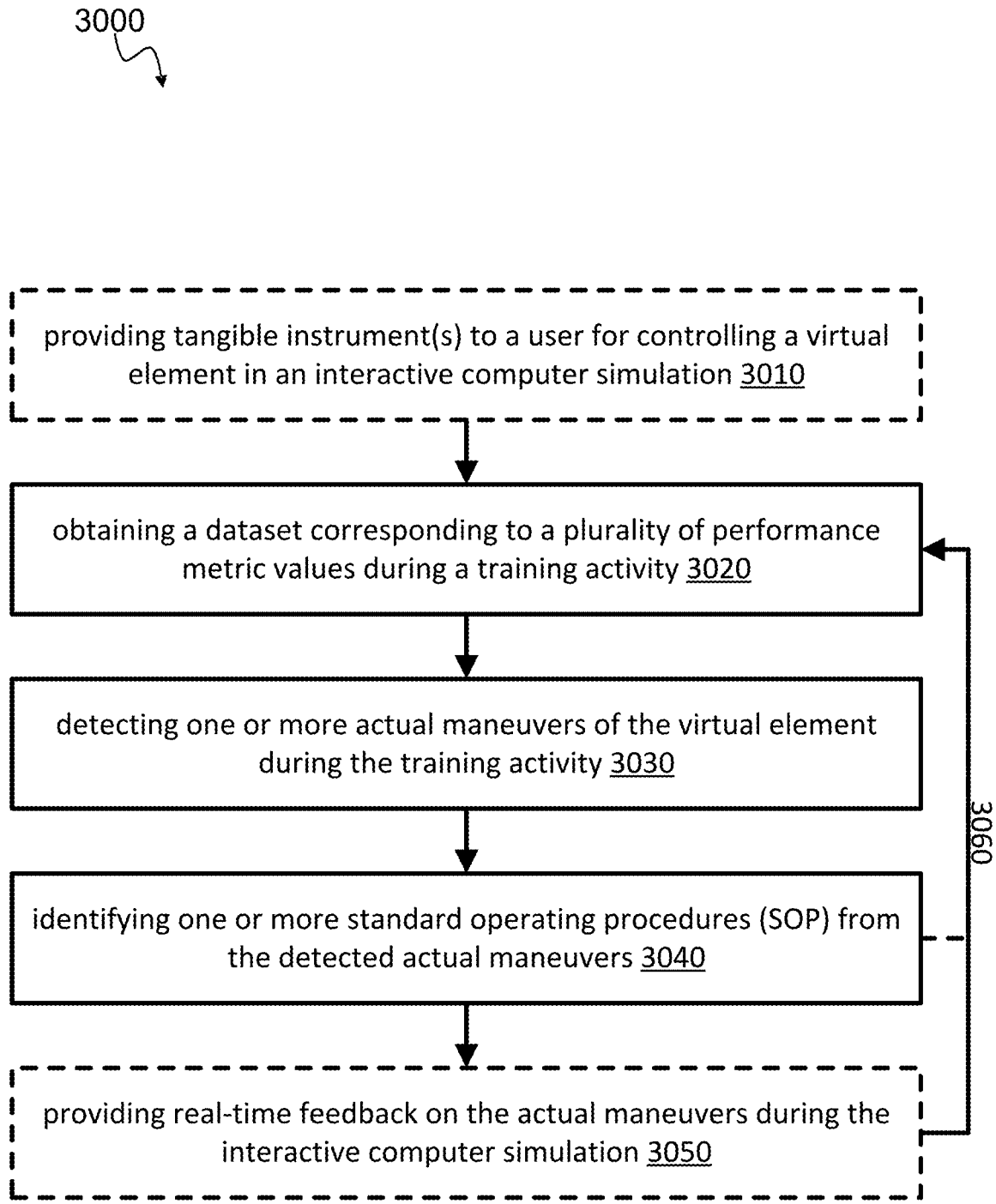
FIG. 3 is a flow chart of a second exemplary method in accordance with the teachings of the present invention.
Figure 4:
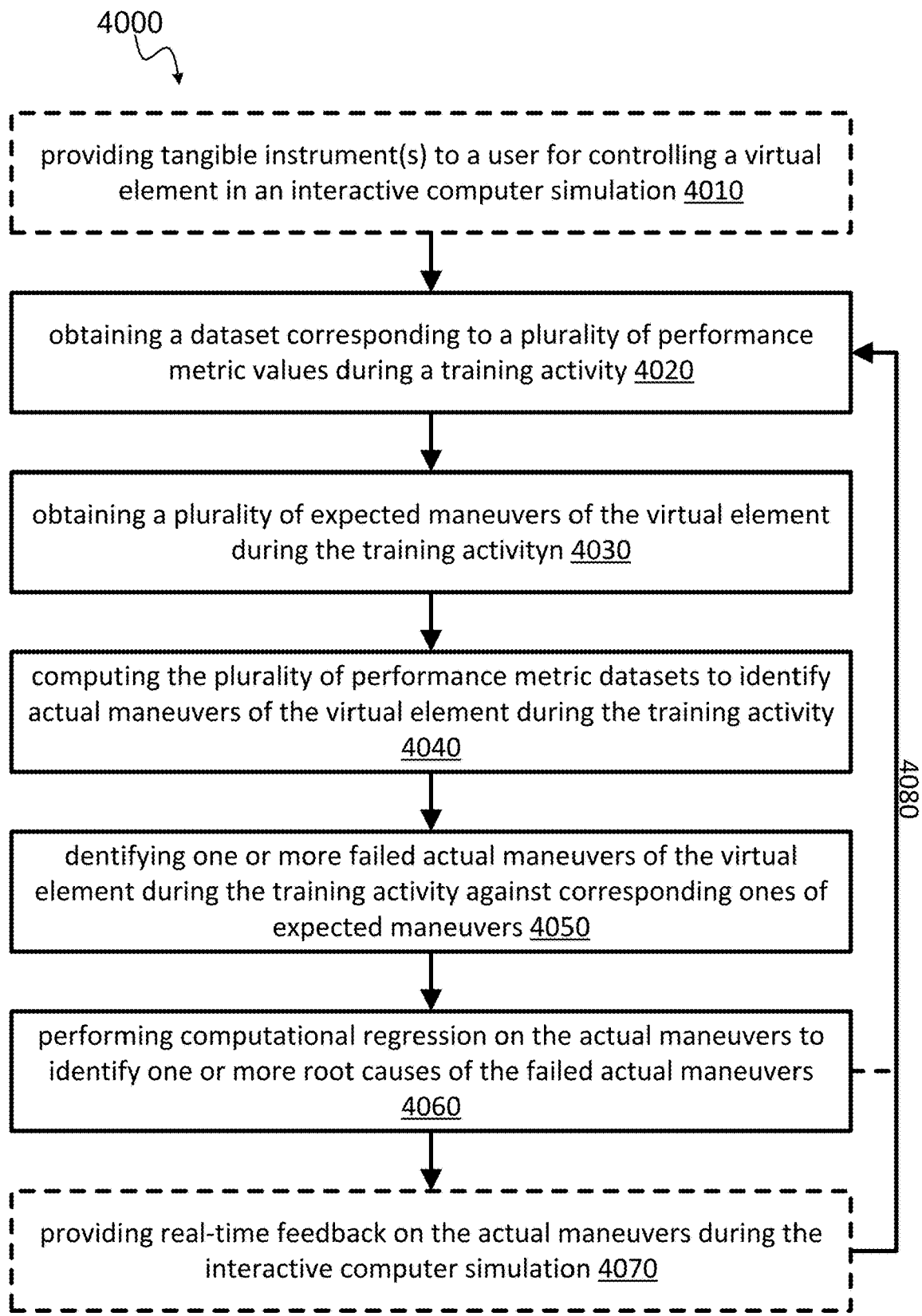
FIG. 4 is a flow chart of a third exemplary method in accordance with the teachings of the present invention.

In FIG. 5, a simulator data acquisition 5100 represents the collection of "raw" dynamic data related to one or more interactive computer simulations. For instances, it may represent flight telemetries related to an aircraft in a flight simulation. The simulator data acquisition 5100 of the dynamic data happens at or from the interactive computer simulation station 1100. For instance, dynamic data related to dynamic systems and dynamic subsystems is collected, without analysis or synchronization (e.g., as it is produced or emitted from different components of the interactive computer simulation). The simulation-related data is sent 5710 to a data frame processor 5200. While a single arrow is shown 5710, it should be understood that the simulation-related data is continually provided to the data frame processor 5200 as it is collected. The data frame processor 5200 builds 5810 simulation data frames from the received data. For instance, in the example of a flight simulation, building 5810 the simulation data frames at the data frame processor 5200 may involve converting raw flight telemetries into a synchronized time series required for event detection. An example of how building 5810 the simulation data frames can be performed is provided with particular reference to FIG. 2 hereinbelow. Again, it should be understood that the simulation data frames are continually provided from the data frame processor 5200, e.g., in accordance with a target time step. The simulation data frames comprise performance metric values related to the ongoing interactive computer simulation.

Different consumers may be interested in the simulation data frames. The example of FIG. 5 shows a simulation event detection 5300 entity and a training event detection 5400 entity, which are involves in assessment of performance of one or more users during the interactive computer simulation. Examples of consumers, amongst others, may comprise a maintenance agent for the interactive computer simulation station (e.g., in relation to QTGs) and accounting systems (e.g., in relation to occupancy and/or costs of operation). In the example of FIG. 5, the simulation data frames are sent 5720, 5722 respectively towards a simulation event detection 5300 entity and a training event detection 5400 entity. Note that it may be pushed through a broadcast and/or multicast mechanism and/or could be pulled by the consumers.

The simulation event detection 5300 entity is then shown detecting 5820 a simulation event in the received data. The detection 5820 may be the result of processing a single of the received frames or the result of processing multiple frames, whether received consecutively or not. For instance, the detected event may be related to a general parameter of the virtual element being simulated (e.g., speed, altitude, temperature, ambient conditions in the interactive computer simulation station, etc.). The detected event may be the result of processing the data frame to detect flight event (ex: a flight exceedance or any other flag on flight status). It may be necessary to persistently collect the detected event 5910 (e.g., depending on the nature of the event or the relation of the event to the training activity). The related data is then sent 5730 for storage at an analytic storage 5400 (e.g., part of the storage system 1500). The analytic storage 5400 may be a database (e.g., SQL compatible) and may further be used to hold scorecards and other analytic data related to training activities.

The training event detection 5400 entity is then shown detecting 5830 a training event in the received data. The detection 5830 may be the result of processing a single of the received frames or the result of processing multiple frames, whether received consecutively or not. For instance, the detected event may be related to a standard operation procedure (SOP) as depicted on FIG. 7, an individual maneuver from FIG. 8 or the nested maneuver 8000 altogether. It may be necessary to persistently grade the detected event 5930 (e.g., depending on the nature of the event or the relation of the event to the training activity). The related data is then sent 5740 for analysis by a grading calculator 5600 that may further require additional simulation related events to properly compute 5840 the grade and build a related scorecard.

Additional simulation related data may then be requested 5750 from the analytic storage 5400 and returned 5760 thereby, if anything relevant exists (e.g., during computational regression following a causal model to identify a root cause, to grade a nested maneuver, etc.). The related scorecard is then sent 5770 for storage at the analytic storage 5400.

The simulation event detection 5300 entity may also more selectively detect 5920 a simulation event in the received data considering scorecards related to the training activity (e.g., a specific period or trigger point from the interactive computer simulation). The simulation event detection 5300 may therefore requests scorecards 5880 from the analytic storage 5400, which returns 5822 relevant ones, if any therefrom. The detection 5822 may be the result of processing a single of the received frames or the result of processing multiple frames, whether received consecutively or not. For instance, the detected event may be related to a general parameter of the virtual element being simulated in relation to the training activity (e.g., speed, altitude, temperature whereas ambient conditions in the interactive computer simulation station may not be relevant, etc.). The detected event may be the result of processing the data frame to detect flight event (ex: a flight exceedance or any other flag on flight status). It may be necessary to persistently collect the detected event 5920 (e.g., depending on the nature of the event or the relation of the event to the training activity). The related data is then sent 5790 for storage at the analytic storage 5400. In some embodiments, the simulation mapping system 1800A, 1800B comprises the data frame processor 5200, the simulation event detection 5300, the analytic storage 5400, the training event detection 5500 and the grading calculator 5600.

Reference is now made to FIGS. 1, 2 and 5 to 8 depicting a first set of embodiments. In the depicted example, the simulation mapping system 1800 is for determining a plurality of performance metric values in relation to a training activity performed by a user in an interactive computer simulation. The interactive computer simulation simulates a virtual element (e.g., flight, land and/or marine vehicle, healthcare-related element, etc.) comprising a plurality of dynamic subsystems. The simulation mapping system comprises a processor module (e.g., 1130, 1830) that obtains dynamic data related to the virtual element being simulated in an interactive computer simulation station comprising a tangible instrument module. The dynamic data captures actions performed by the user during the training activity on one or more tangible instruments of the tangible instrument module (1160). The processor module also constructs a dataset corresponding to the plurality of performance metric values from the dynamic data having a target time step by synchronizing dynamic data from at least two of the dynamic subsystems into the dataset considering the target time step, the at least two of the dynamic subsystems being associated to at least one common performance metric values from the plurality of performance metric values and by inferring, for at least one missing dynamic subsystems of the plurality of dynamic subsystems missing from the dynamic data, a new set of data into the dataset from dynamic data associated to one or more co-related dynamic subsystems, the co-related dynamic subsystems and the at least one missing dynamic subsystems impacting at least one common performance metric values from the plurality of performance metric values.

The processor module may optionally obtain dynamic data from a plurality of interactive computer simulation stations and constructs the dataset having the target time step for the plurality of interactive computer simulation stations.

The processor module may optionally further provide the dataset as a common standardized stream consumers, the consumers comprising a grading system. The common standardized stream may comprise classification information related to the plurality of performance metric values.

The processor module may optionally, when constructing the dataset corresponding to the plurality of performance metric values from the dynamic data having the target time, add at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

The processor module may optionally apply a linear quadratic estimation (LQE) when constructing the dataset and/or a probabilistic directed acyclic graphical model when constructing the dataset.

In the first set of embodiments a second aspect is directed to a method 2000 for determining a plurality of performance metric values in relation to a training activity performed by a user in an interactive computer simulation, the interactive computer simulation simulating a virtual element comprising a plurality of dynamic subsystems. The method 2000 comprises obtaining 2020 dynamic data related to the virtual element being simulated in an interactive computer simulation station comprising a tangible instrument module. The dynamic data captures actions performed by the user during the training activity on one or more tangible instruments of the tangible instrument module provided 2010 to the user. The method 2000 also comprises constructing a dataset corresponding to the plurality of performance metric values from the dynamic data having a target time step by synchronizing 2030 dynamic data from at least two of the dynamic subsystems into the dataset considering the target time step, the at least two of the dynamic subsystems being associated to at least one common performance metric values from the plurality of performance metric values and inferring 2040, for at least one missing dynamic subsystem of the plurality of dynamic subsystems missing from the dynamic data, a new set of data into the dataset from dynamic data associated to one or more co-related dynamic subsystems, the co-related dynamic subsystems and the at least one missing dynamic subsystems impacting the at least one common performance metric values from the plurality of performance metric values. 2020, 2030 and 2040 are repeated (2050) as needed considering the behavior of the virtual element/the user in the interactive computer simulation.

The method 2000 may optionally further comprise obtaining dynamic data from a plurality of interactive computer simulation stations, wherein constructing the dataset having the target time step is performed for the plurality of interactive computer simulation stations.

The method 2000 may optionally further comprise providing the dataset as a common standardized stream consumers, the consumers comprising a grading system. The common standardized stream may optionally comprise classification information related to the plurality of performance metric values.

The method 2000 may optionally further comprise, when constructing the dataset corresponding to the plurality of performance metric values from the dynamic data having the target time, adding at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

Optionally, constructing the dataset may performed by applying a linear quadratic estimation (LQE) and/or by applying a probabilistic directed acyclic graphical model when constructing the dataset.

Reference is now made to FIGS. 1, 3 and 5 to 8 depicting a second set of embodiments. In the depicted example, an interactive computer simulation system (e.g., 1000) is provided for training a user in an interactive computer simulation in the performance of a task through a training activity, the interactive computer simulation simulating a virtual element. The interactive computer simulation system comprises an interactive computer simulation station (e.g., 1100) and a processor module (e.g., 1130, 1830). The interactive computer simulation station comprises a tangible instrument module (e.g., 1160), the user interacting with the tangible instrument module for controlling the virtual element in the interactive computer simulation.

The processor module obtains a plurality of performance metric datasets related to the virtual element being simulated, the plurality of performance metric datasets representing results of the interactions between the user and the tangible instrument module and, during execution of the interactive computer simulation, detects, in the plurality of performance metric datasets, a plurality of actual maneuvers of the virtual element during the training activity, identifies one or more standard operating procedures (SOP) for the training activity from a plurality of the individually detected actual maneuvers, provides, in real-time upon detection of the SOPs, information for display in the interactive computer simulation related the SOPs.

The system may optionally further comprise a simulation mapping system (e.g., 1800) for determining a plurality of performance metric values in relation to the training activity performed by the user in the interactive computer simulation, the interactive computer simulation simulating the virtual element comprising a plurality of dynamic subsystems. The plurality of performance metric datasets may be provided by the simulation mapping system.

The processor module may further obtain a scorecard related to the training activity to establish a list of the one or more SOPs of interest. The one or more SOPs may identify the plurality of the individually detected actual maneuvers related thereto.

The plurality of performance metric datasets related to the virtual element being simulated may be used to provide a grading scorecard for the detected SOPs. The information for display in the interactive computer simulation related the SOPs may further comprise the grading scorecard for the detected SOPs. The detected actual maneuvers may be logged for post-activity debriefing.

In an optional embodiment, the processor module further obtains a plurality of expected maneuvers of the virtual element during the training activity, the plurality of expected maneuvers comprising a plurality of expected individual maneuvers expected and one or more nested maneuvers formed by more than one individual maneuvers from the plurality of expected individual maneuvers, computes the plurality of performance metric datasets to identify actual maneuvers of the virtual element during the training activity, identifies and grades one or more actual nested maneuvers against corresponding ones of the expected nested maneuvers and, notwithstanding performance of the actual nested maneuvers, identifies and grades a plurality of actual individual maneuvers against the plurality of expected individual maneuvers.

In the second set of embodiments, a second aspect is directed to an interactive computer simulation station (e.g., 1100) for training a user in an interactive computer simulation in the performance of a task through a training activity, the interactive computer simulation simulating a virtual element. The interactive computer simulation station comprises a tangible instrument module 1160, the user interacting with the tangible instrument module for controlling the virtual element in the interactive computer simulation and a processor module.

The processor module (e.g., 1130) obtains a plurality of performance metric datasets related to the virtual element being simulated, the plurality of performance metric datasets representing results of the interactions between the user and the tangible instrument module and, during execution of the interactive computer simulation, detects, in the plurality of performance metric datasets, a plurality of actual maneuvers of the virtual element during the training activity, identifies one or more standard operating procedures (SOP) for the training activity from a plurality of the individually detected actual maneuvers and provides, in real-time upon detection of the SOPs, information for display in the interactive computer simulation related the SOPs.

The interactive computer simulation station may further comprise a network interface nodule (e.g., 1140) for receiving the plurality of performance metric datasets from a simulation mapping system that determines a plurality of performance metric values in relation to the training activity performed by the user in the interactive computer simulation.

The processor module may optionally further obtain a scorecard related to the training activity to establish a list of the one or more SOPs of interest. The one or more SOPs may further identify the plurality of the individually detected actual maneuvers related thereto.

The plurality of performance metric datasets related to the virtual element being simulated may be used to provide a grading scorecard for the detected SOPs. The information for display in the interactive computer simulation related the SOPs may comprise the grading scorecard for the detected SOPs.

In an optional embodiment, the processor module further obtains a plurality of expected maneuvers of the virtual element during the training activity, the plurality of expected maneuvers comprising a plurality of expected individual maneuvers expected and one or more nested maneuvers formed by more than one individual maneuvers from the plurality of expected individual maneuvers, computes the plurality of performance metric datasets to identify actual maneuvers of the virtual element during the training activity, identifies and grades one or more actual nested maneuvers against corresponding ones of the expected nested maneuvers and, notwithstanding performance of the actual nested maneuvers, identifies and grades a plurality of actual individual maneuvers against the plurality of expected individual maneuvers.

In the second set of embodiments a third aspect is directed to a method 3000 for training a user in an interactive computer simulation in the performance of a task through a training activity, the interactive computer simulation simulating a virtual element. The method 3000 comprises in an interactive computer simulation station, providing 3010 a tangible instrument module (e.g., 1160) to the user for controlling the virtual element in the interactive computer simulation. The method 3000 also comprises obtaining 3020 a plurality of performance metric datasets related to the virtual element being simulated, the plurality of performance metric datasets representing results of the interactions between the user and the tangible instrument module and, during execution of the interactive computer simulation at the interactive computer simulation station, detecting 3030, in the plurality of performance metric datasets, one or more actual maneuvers of the virtual element during the training activity, identifying 3040 one or more standard operating procedures (SOP) from the detected actual maneuvers and displaying 3050, in real-time upon detection of the SOPs, information in the interactive computer simulation related the SOPs. 3020, 3030, 3040 and optionally 3060 may be repeated 3060 multiple times, depending on the behavior of the virtual element/the user in the interactive computer simulation.

The method 3000 may further optionally comprise determining, at a simulation mapping system, a plurality of performance metric values in relation to the training activity performed by the user in the interactive computer simulation, the interactive computer simulation simulating the virtual element comprising a plurality of dynamic subsystems. The plurality of performance metric datasets may be provided by the simulation mapping system.

The method 3000 may further optionally comprise obtaining a scorecard related to the training activity to establish a list of the one or more SOPs of interest. The one or more SOPs may further identify the plurality of the individually detected actual maneuvers related thereto.

The plurality of performance metric datasets related to the virtual element being simulated may be used to provide a grading scorecard for the detected SOPs. The information for display in the interactive computer simulation related the SOPs may then optionally comprise the grading scorecard for the detected SOPs.

The method 3000 may further optionally comprise logging the detected actual maneuvers and debriefing the training activity from the logged detected actual maneuvers.

In some embodiments, the method 3000 may further optionally comprise obtaining a plurality of expected maneuvers of the virtual element during the training activity, the plurality of expected maneuvers comprising a plurality of expected individual maneuvers expected and one or more nested maneuvers formed by more than one individual maneuvers from the plurality of expected individual maneuvers, computing the plurality of performance metric datasets to identify actual maneuvers of the virtual element during the training activity, identifying and grades one or more actual nested maneuvers against corresponding ones of the expected nested maneuvers and, notwithstanding performance of the actual nested maneuvers, identifying and grading a plurality of actual individual maneuvers against the plurality of expected individual maneuvers.

Reference is now made to FIGS. 1 and 4 to 8 depicting a third set of embodiments. An interactive computer-based training system (e.g., 1000) is depicted for assessing a training activity performed by a user in an interactive computer simulation, the interactive computer simulation simulating a virtual element. The training system comprises an interactive computer simulation station (e.g., 1100) comprising a tangible instrument module (e.g., 1160), the user interacting with the tangible instrument module for controlling the virtual element in the interactive computer simulation and a processor module (e.g., 1130, 1830). The processor module obtains a plurality of performance metric datasets related to the virtual element being simulated the interactive computer simulation station, the plurality of performance metric datasets representing results of the interactions between the user and the tangible instrument module, obtains a plurality of expected maneuvers of the virtual element during the training activity, the plurality of expected maneuvers, computes the plurality of performance metric datasets to identify actual maneuvers of the virtual element during the training activity, identifies one or more failed actual maneuvers of the virtual element during the training activity against corresponding ones of the expected maneuvers and performs computational regression on the actual maneuvers of the virtual element compared to the expected maneuvers of the virtual element to identify one or more root causes of the failed actual maneuvers, the computational regression being performed on the actual maneuvers notwithstanding the corresponding expected maneuvers being met thereby.

The system may further optionally comprise a simulation mapping system for determining a plurality of performance metric values in relation to the training activity performed by the user in the interactive computer simulation, the interactive computer simulation simulating the virtual element comprising a plurality of dynamic subsystems, wherein the plurality of performance metric datasets is provided by the simulation mapping system.

The processor module may further optionally map, in real-time, each one of the actual maneuvers of the virtual element during the training activity on causal model for linking the one actual maneuver with previous ones of the actual maneuvers. The processor module may then optionally associate a probability rating to the one or more root causes of the failed actual maneuvers considering the causal model.

The processor module may further optionally provide to an instructor of the user, in real-time, the one or more root causes of the failed actual maneuvers.

The plurality of performance metric datasets related to the virtual element being simulated may be used to provide a grading scorecard for the actual maneuvers. The grading scorecard for the actual maneuvers may be provided for display in the interactive computer simulation.

In the third set of embodiments a second aspect is directed to an interactive computer simulation station (e.g., 1100) for assessing a training activity performed by a user in an interactive computer simulation, the interactive computer simulation simulating a virtual element. The interactive computer simulation station comprises a tangible instrument module (e.g., 1160), the user interacting with the tangible instrument module for controlling the virtual element in the interactive computer simulation and a processor module. The processor module (e.g., 1130) obtains a plurality of performance metric datasets related to the virtual element being simulated the interactive computer simulation station, the plurality of performance metric datasets representing results of the interactions between the user and the tangible instrument module, obtains a plurality of expected maneuvers of the virtual element during the training activity, the plurality of expected maneuvers, computes the plurality of performance metric datasets to identify actual maneuvers of the virtual element during the training activity, identifies one or more failed actual maneuvers of the virtual element during the training activity against corresponding ones of the expected maneuvers and performs computational regression on the actual maneuvers of the virtual element compared to the expected maneuvers of the virtual element to identify one or more root causes of the failed actual maneuvers, the computational regression being performed on the actual maneuvers notwithstanding the corresponding expected maneuvers being met thereby.

The interactive computer simulation station may further comprise a network interface nodule (e.g., 1140) for receiving the plurality of performance metric datasets from a simulation mapping system that determines a plurality of performance metric values in relation to the training activity performed by the user in the interactive computer simulation.

The processor module may further optionally map, in real-time, each one of the actual maneuvers of the virtual element during the training activity on causal model for linking the one actual maneuver with previous ones of the actual maneuvers and associate a probability rating to the one or more root causes of the failed actual maneuvers considering the causal model.

The processor module may further optionally provide to an instructor of the user, in real-time, the one or more root causes of the failed actual maneuvers.

The plurality of performance metric datasets related to the virtual element being simulated may be used to provide a grading scorecard for the actual maneuvers. The grading scorecard for the actual maneuvers may then be provided for display in the interactive computer simulation.

In the third set of embodiments a third aspect is directed to a method 4000 is depicted for assessing a training activity performed by a user in an interactive computer simulation, the interactive computer simulation simulating a virtual element. The method 4000 comprises obtaining 4020 a plurality of performance metric datasets related to the virtual element being simulated the interactive computer simulation station, the plurality of performance metric datasets representing results of interactions of the user provided 4010 with a tangible instrument module (e.g., 1160) in an interactive computer simulation station, the user interacting with the tangible instrument module for controlling the virtual element in the interactive computer simulation, obtaining 4030 a plurality of expected maneuvers of the virtual element during the training activity, computing 4040 the plurality of performance metric datasets to identify actual maneuvers of the virtual element during the training activity, identifying 4050 one or more failed actual maneuvers of the virtual element during the training activity against corresponding ones of the expected maneuvers and performing 4060 computational regression on the actual maneuvers of the virtual element compared to the expected maneuvers of the virtual element to identify one or more root causes of the failed actual maneuvers, the computational regression being performed on the actual maneuvers notwithstanding the corresponding expected maneuvers being met thereby.

The method 4000 may optionally further comprise determining, at a simulation mapping system (e.g., 1800), a plurality of performance metric values in relation to the training activity performed by the user in the interactive computer simulation, the interactive computer simulation simulating the virtual element comprising a plurality of dynamic subsystems, wherein the plurality of performance metric datasets is provided by the simulation mapping system.

The method 4000 may optionally further comprise mapping, in real-time, each one of the actual maneuvers of the virtual element during the training activity on causal model for linking the one actual maneuver with previous ones of the actual maneuvers. The method 4000 may then further comprise associating a probability rating to the one or more root causes of the failed actual maneuvers considering the causal model and providing to an instructor of the user, in real-time, the one or more root causes of the failed actual maneuvers. The plurality of performance metric datasets related to the virtual element being simulated may be used to provide a grading scorecard for the actual maneuvers. The method 4000 may optionally further comprise providing 4070 for display in the interactive computer simulation the grading scorecard for the actual maneuvers. 4020, 4030, 4040, 4050, 4060 and optionally 4070 may be repeated 4080 multiple times, depending on the behavior of the virtual element/the user in the interactive computer simulation.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A simulation mapping system for determining a plurality of performance metric values in relation to a training activity performed by a user in an interactive computer simulation, the interactive computer simulation simulating a virtual element comprising a plurality of dynamic subsystems, the simulation mapping system comprising:
a processor module configured to:
obtain dynamic data related to the virtual element being simulated in an interactive computer simulation station comprising a tangible instrument module, wherein the dynamic data captures actions performed by the user during the training activity on one or more tangible instruments of the tangible instrument module; and
construct a dataset corresponding to the plurality of performance metric values from the dynamic data having a target time step by:
synchronizing dynamic data from at least two of the dynamic subsystems into the dataset considering the target time step, the at least two of the dynamic subsystems being associated to at least one common performance metric values from the plurality of performance metric values; and
inferring, for at least one missing dynamic subsystems of the plurality of dynamic subsystems missing from the dynamic data, a new set of data into the dataset from dynamic data associated to one or more co-related dynamic subsystems, the co-related dynamic subsystems and the at least one missing dynamic subsystems impacting at least one common performance metric values from the plurality of performance metric values.

2. The simulation mapping system of claim 1, wherein the processor module is configured to obtain dynamic data from a plurality of interactive computer simulation stations and construct the dataset having the target time step for the plurality of interactive computer simulation stations.

3. The simulation mapping system of claim 1, wherein processor module is further configured to provide the dataset as a common standardized stream consumers, the consumers comprising a grading system.

4. The simulation mapping system of claim 3, wherein the common standardized stream comprises classification information related to the plurality of performance metric values.

5. The simulation mapping system of claim 1, wherein the processor module is configured to, when constructing the dataset corresponding to the plurality of performance metric values from the dynamic data having the target time, add at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

6. The simulation mapping system of claim 1, wherein the processor module is configured to apply a linear quadratic estimation (LQE) when constructing the dataset.

7. The simulation mapping system of claim 1, wherein the processor module is configured to apply a probabilistic directed acyclic graphical model when constructing the dataset.

8. A method for determining a plurality of performance metric values in relation to a training activity performed by a user in an interactive computer simulation, the interactive computer simulation simulating a virtual element comprising a plurality of dynamic subsystems, the method comprising:
obtaining dynamic data related to the virtual element being simulated in an interactive computer simulation station comprising a tangible instrument module, wherein the dynamic data captures actions performed by the user during the training activity on one or more tangible instruments of the tangible instrument module; and
constructing a dataset corresponding to the plurality of performance metric values from the dynamic data having a target time step by:
synchronizing dynamic data from at least two of the dynamic subsystems into the dataset considering the target time step, the at least two of the dynamic subsystems being associated to at least one common performance metric values from the plurality of performance metric values; and
inferring, for at least one missing dynamic subsystem of the plurality of dynamic subsystems missing from the dynamic data, a new set of data into the dataset from dynamic data associated to one or more co-related dynamic subsystems, the co-related dynamic subsystems and the at least one missing dynamic subsystems impacting the at least one common performance metric values from the plurality of performance metric values.

9. The method of claim 8, further comprising obtaining dynamic data from a plurality of interactive computer simulation stations, wherein constructing the dataset having the target time step is performed for the plurality of interactive computer simulation stations.

10. The method of claim 8, further comprising providing the dataset as a common standardized stream consumers, the consumers comprising a grading system.

11. The method of claim 10, wherein the common standardized stream comprises classification information related to the plurality of performance metric values.

12. The method of claim 8, further comprising, when constructing the dataset corresponding to the plurality of performance metric values from the dynamic data having the target time, adding at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

13. The method of claim 8, wherein constructing the dataset is performed by applying a linear quadratic estimation (LQE).

14. The method of claim 8, wherein constructing the dataset is performed by applying a probabilistic directed acyclic graphical model when constructing the dataset.

15. A non-transitory computer-readable medium having computer-readable instructions stored thereon, which, when executed by a processor of a computer system, configures the computer system to perform a method for determining a plurality of performance metric values in relation to a training activity performed by a user in an interactive computer simulation, the interactive computer simulation simulating a virtual element comprising a plurality of dynamic subsystems, the method comprising:

obtaining dynamic data related to the virtual element being simulated in an interactive computer simulation station comprising a tangible instrument module, wherein the dynamic data captures actions performed by the user during the training activity on one or more tangible instruments of the tangible instrument module; and constructing a dataset corresponding to the plurality of performance metric values from the dynamic data having a target time step by:

synchronizing dynamic data from at least two of the dynamic subsystems into the dataset considering the target time step, the at least two of the dynamic subsystems being associated to at least one common performance metric values from the plurality of performance metric values; and inferring, for at least one missing dynamic subsystem of the plurality of dynamic subsystems missing from the dynamic data, a new set of data into the dataset from dynamic data associated to one or more co-related dynamic subsystems, the co-related dynamic subsystems and the at least one missing dynamic subsystems impacting the at least one common performance metric values from the plurality of performance metric values.

16. The non-transitory computer-readable medium of claim 15 wherein the method further comprises obtaining dynamic data from a plurality of interactive computer simulation stations, and wherein constructing the dataset having the target time step is performed for the plurality of interactive computer simulation stations.

17. The non-transitory computer-readable medium of claim 15 wherein the method further comprises providing the dataset as a common standardized stream consumers, the consumers comprising a grading system.

18. The non-transitory computer-readable medium of claim 17, wherein the common standardized stream comprises classification information related to the plurality of performance metric values.

19. The non-transitory computer-readable medium of claim 15 wherein the method further comprises when constructing the dataset corresponding to the plurality of performance metric values from the dynamic data having the target time, adding at least one simulated dynamic subsystem missing from the dynamic data and an additional set of data into the dataset from dynamic data associated to one or more co-related dynamic subsystems, the co-related dynamic subsystems and the at least one simulated dynamic subsystems impacting the at least one common performance metric values from the plurality of performance metric values.

20. The non-transitory computer-readable medium of claim 15 wherein constructing the dataset is performed by applying a linear quadratic estimation (LQE).

\* \* \* \* \*

UNITED STATES PATENT AND TRADEMARK OFFICE
CERTIFICATE OF CORRECTION

PATENT NO. : 10,991,262 B2
APPLICATION NO. : 15/942404
DATED : April 27, 2021
INVENTOR(S) : Jean-François Delisle et al.

Page 1 of 1

It is certified that error appears in the above-identified patent and that said Letters Patent is hereby corrected as shown below:

On the Title Page

Item (72) Inventors: Line 2:
"Antoine Dufour" should be "Anthoine Dufour"

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*